(12) United States Patent
Wu et al.

(10) Patent No.: US 11,055,517 B2
(45) Date of Patent: Jul. 6, 2021

(54) NON-CONTACT HUMAN INPUT METHOD AND NON-CONTACT HUMAN INPUT SYSTEM

(71) Applicant: QISDA CORPORATION, Taoyuan (TW)

(72) Inventors: Tsung-Hsun Wu, Taoyuan (TW); Min-Hsiung Huang, Taoyuan (TW)

(73) Assignee: QISDA CORPORATION, Taoyuan (TW)

( * ) Notice: Subject to any disclaimer, the term of this patent is extended or adjusted under 35 U.S.C. 154(b) by 85 days.

(21) Appl. No.: 16/290,964

(22) Filed: Mar. 4, 2019

(65) Prior Publication Data

US 2019/0278981 A1    Sep. 12, 2019

(30) Foreign Application Priority Data

Mar. 9, 2018 (CN) .......................... 201810194338.3

(51) Int. Cl.
*G06K 9/00* (2006.01)
(52) U.S. Cl.
CPC ..... *G06K 9/00335* (2013.01); *G06K 9/00362* (2013.01)
(58) Field of Classification Search
CPC .................. G06K 9/00335; G06K 9/00362
See application file for complete search history.

(56) References Cited

U.S. PATENT DOCUMENTS

| 9,176,608 | B1* | 11/2015 | Baldwin | G06K 9/00335 |
| 2005/0271252 | A1* | 12/2005 | Yamada | G06K 9/00335 |
| | | | | 382/103 |
| 2008/0159596 | A1* | 7/2008 | Li | G06K 9/00335 |
| | | | | 382/107 |
| 2009/0304232 | A1* | 12/2009 | Tsukizawa | G06K 9/0061 |
| | | | | 382/103 |

(Continued)

FOREIGN PATENT DOCUMENTS

| CN | 101441513 | 5/2009 |
| CN | 106814854 | 6/2017 |

OTHER PUBLICATIONS

Schwarz, Julia, et al. "Combining body pose, gaze, and gesture to determine intention to interact in vision-based interfaces." Proceedings of the SIGCHI Conference on Human Factors in Computing Systems. 2014. (Year: 2014).*

(Continued)

*Primary Examiner* — Utpal D Shah
(74) *Attorney, Agent, or Firm* — Winston Hsu

(57) ABSTRACT

A non-contact human input method is to capture an image in front of a non-contact human input interface of the non-contact human input system, then extract a figure from the image, and then determine whether a user corresponding to the figure is at an input state according to a posture of the figure. The method is to ignore actions of the user when the user is not at the input state. The method is to receive a voice input or a posture input from the user when the user is at the input state. A non-contact human input system includes a (Continued)

displaying device, at least one camera, and a processor electrically connected to the displaying device and the at least one camera. The at least one camera is used to capture an image of a user. The processor implements the above non-contact human input method.

15 Claims, 12 Drawing Sheets

(56) References Cited

U.S. PATENT DOCUMENTS

| | | | |
|---|---|---|---|
| 2012/0257035 A1* | 10/2012 | Larsen | G06F 3/017 |
| | | | 348/78 |
| 2016/0283783 A1* | 9/2016 | Yang | G06K 9/00342 |
| 2019/0064929 A1* | 2/2019 | Tomeh | G06F 3/0304 |
| 2019/0065872 A1* | 2/2019 | Yamanaka | B60W 40/09 |
| 2020/0202856 A1* | 6/2020 | Ivanov Bonev | G10L 15/08 |

OTHER PUBLICATIONS

L. Zhang, D. Tjondronegoro and V. Chandran, "Evaluation of Texture and Geometry for Dimensional Facial Expression Recognition," 2011 International Conference on Digital Image Computing: Techniques and Applications, Noosa, QLD, 2011, pp. 620-626, doi: 10.1109/DICTA.2011.110. (Year: 2011).*

* cited by examiner

NON-CONTACT HUMAN INPUT METHOD AND NON-CONTACT HUMAN INPUT SYSTEM

BACKGROUND OF THE INVENTION

1. Field of the Invention

The present invention relates to a non-contact human input method and system, and more particularly to a non-contact human input method and system capable of determining whether a user is at an input state.

2. Description of the Prior Art

In conventional non-contact human input systems, users can perform inputting in a non-contact way. For example, a camera is used to capture a gesture image of a user. The gesture image is analyzed for obtaining a corresponding input operation. Then, the input systems will respond to the input operation, for example by moving a window. However, not all of gestures of the user are intended to input. For example, the user waves his arms subconsciously, or waves his arms habitually when talking with other people. The input systems may regard these gestures as legal input operations, resulting in an unexpected system response, such as closing a window, deleting files. This phenomenon induces inconvenience in using the input systems. Furthermore, when there are several persons who use the input system at the same time, there may be interactions (e.g. waves of arms during a conversation) between the persons irrelevant to any input operation, so that the input system produces unexpected system responses frequently, which makes the above problem worse.

SUMMARY OF THE INVENTION

The present disclosure provides a non-contact human input method for a non-contact human input system. The non-contact human input method determines whether a user is at an input state by analyzing a posture of a user, so as to avoid regarding responses of a user (including actions, sounds and so on) which are not intended to be non-contact inputs as inputs.

A non-contact human input method according to the present invention includes the following steps of: capturing an image in front of a non-contact human input interface of the non-contact human input system; extracting a figure from the image; determining whether a user corresponding to the figure is at an input state according to a posture of the figure; and the non-contact human input interface ignoring actions of the user corresponding to the figure when the user corresponding to the figure is determined not to be at the input state. Further, the non-contact human input method includes the step of: the non-contact human input system receiving a voice input or a posture input from the user through the non-contact human input interface when the user corresponding to the figure is determined to be at the input state. Thereby, the non-contact human input method can identify whether the user is at the input state, so as to avoid regarding responses of a user which are not intended to be non-contact inputs as legal inputs resulting in unexpected system responses, such as closing a window, deleting files.

Another objective of the invention is to provide a non-contact human input system. The non-contact human input system uses the above non-contact human input method and therefore, can avoid regarding responses of a user which are not intended to be non-contact inputs as inputs.

A non-contact human input system according to the present invention includes a displaying device, at least one camera, and a processor. The processor is electrically connected to the displaying device and the at least one camera. The processor uses the at least one camera to capture an image in front of the displaying device, extracts a figure from the image, and determines whether a user corresponding to the figure is at an input state according to a posture of the figure. When the processor determines that the user corresponding to the figure is not at the input state, the processor ignores actions of the user corresponding to the figure. When the processor determines that the user corresponding to the figure is at the input state, the processor receives a voice input or a posture input from the user. Thereby, the non-contact human input system can identify whether the user is at the input state, so as to avoid regarding responses of a user which are not intended to be non-contact inputs as legal inputs resulting in unexpected system responses, such as closing a window, deleting files.

Compared with the prior art, the non-contact human input method and the non-contact human input system of the invention can determine whether a user is at an input state by analyzing the posture of the user, so as to avoid regarding responses of a user (including actions, sounds and so on) which are not intended to be non-contact inputs as inputs. Therefore, the invention can effectively solve the problem that the input system in the prior art produces an unexpected system response because of receiving a gesture of a user which is not for input.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
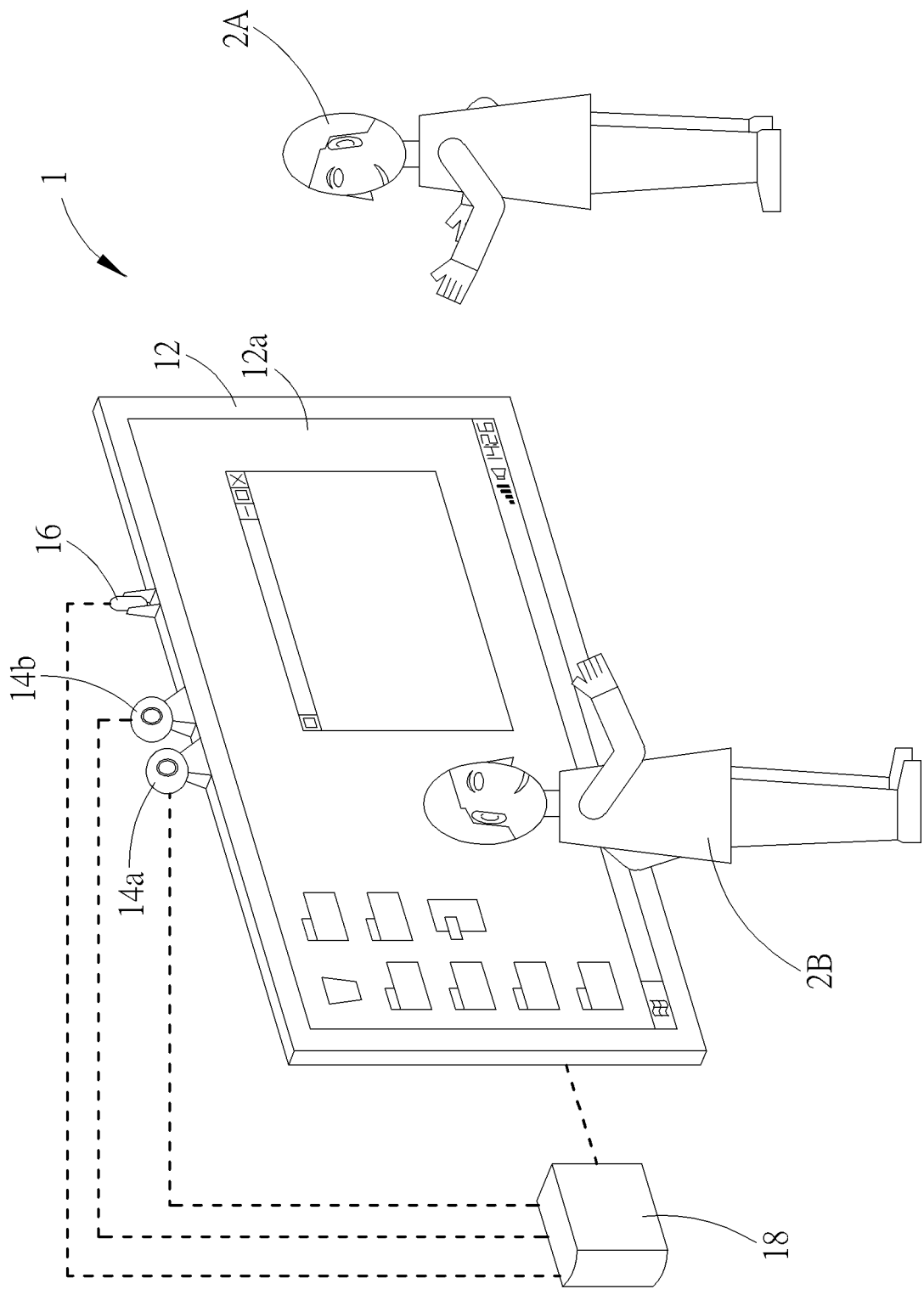
FIG. 1 is a schematic diagram illustrating the disposition of a non-contact human input system according to an embodiment.
Figure 2:
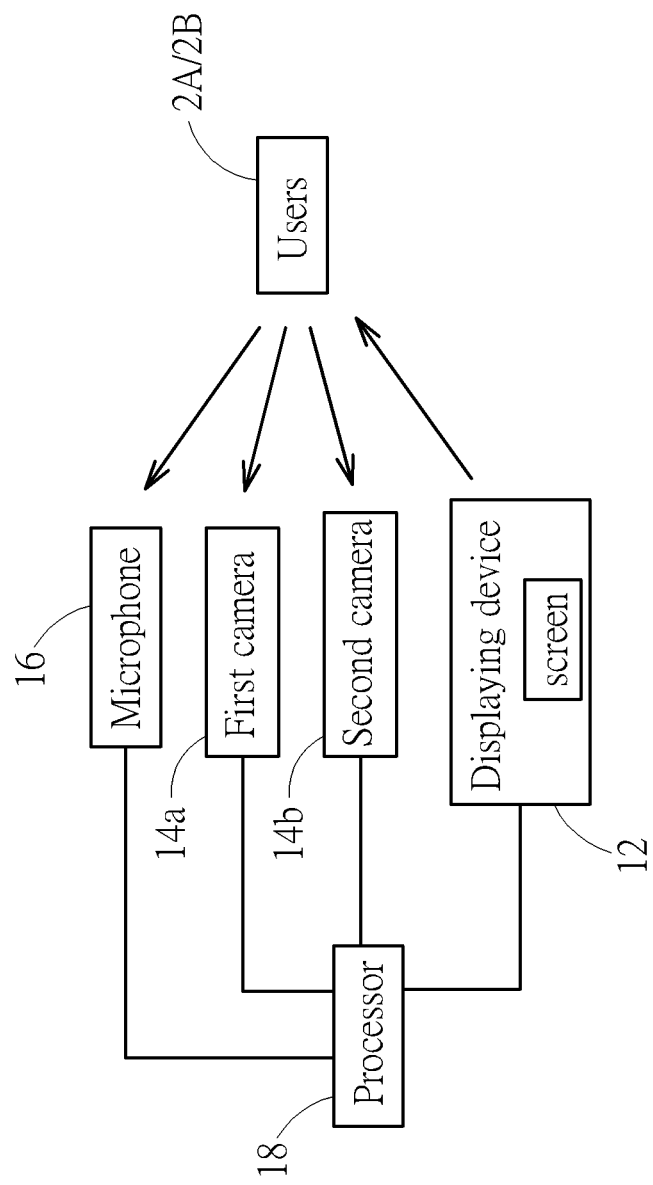
FIG. 2 is a functional block diagram of the non-contact human input system in FIG. 1.

Please refer to FIG. 1 and FIG. 2. A non-contact human input system 1 according to an embodiment includes a displaying device 12, a first camera 14a, a second camera 14b, a microphone 16, and a processor 18. The processor 18 is electrically connected to the displaying device 12, the first camera 14a, the second camera 14b, and the microphone 16 (indicated by dashed lines in FIG. 1). Therein, the displaying device 12 is a monitor (for example but not limited to a liquid crystal display). In practice, the displaying device 12 can be realized by a projector with a curtain (or a surface on which images can be projected, e.g. a wall surface), or by a 3D projection monitor. The first camera 14a and the second camera 14b are separate parts relative to the displaying device 12 and are disposed on the displaying device 12. The lens of the first camera 14a and the second camera 14b face the space in front of the displaying device 12 so as to be able to capture images in front of the displaying device 12. In practice, the first camera 14a and the second camera 14b also can be structurally integrated with the displaying device 12. For example, the lenses of the cameras 14a and 14b are exposed through an upper rim of the displaying device 12. The microphone 16 is an independent part disposed on the displaying device 12. In practice, the microphone 16 can be structurally integrated with the displaying device 12, the first camera 14a, or the second camera 14b. The processor 18 can be implemented by a computer host; in practice, the processor 18 can be but not limited to a circuit board module (including a circuit board and at least one processing unit, memory, at least one electronic connection interface, and other electronic components required in operation which are disposed on the circuit board). The processor 18 can be electrically connected with the displaying device 12, the first camera 14a, and the second camera 14b directly or indirectly. The processor 18 also can be integrated with the displaying device 12, for example in an all-in-one PC. The processor 18 controls the displaying device 12 to display images on the screen 12a. Users 2A and 2B can stand in front of the displaying device 12 and then perform non-contact input operation by reference to images disposed on the screen 12a.

In the embodiment, the non-contact human input system 1 provides a non-contact human input interface to users through the first camera 14a, the second camera 14b, and images displayed on the displaying device 12. Then the user can perform input operation through the non-contact human input interface. When the non-contact human input system 1 is at a state so that the non-contact human input system 1 can receive non-contact inputs (or the non-contact human input system 1 is always at the state), the processor 18 uses the first camera 14a to capture an image in front of the displaying device 12 (or the screen 12a). For example, the users 2A and 2B stand in the visual field of the first camera 14a, so the captured image includes the users 2A and 2B. The processor 18 can extract figures of the users 2A and 2B from the captured image, for example by image processing software available on the market to find out profiles (maybe including profiles of human features, such as face, eyes, ears, nose, mouth, eyebrows), which will not be described further. Then, the processor 18 can determine whether the user 2A or the user 2B is at an input state according to the posture of the figure corresponding to the user 2A or the user 2B respectively.

In general, when the users 2A and 2B are at the input state, the users 2A and 2B will look at or face the screen 12a. Therefore, in practice, whether the users 2A and 2B are at the input state can be determined by analyzing the situation of the heads of the users 2A and 2B. In the embodiment, the figure at least includes a head and at least one organ on the head. The processor 18 determines whether the users 2A and 2B are at the input state according to the head and the geometric dimensions of the at least one organ relative to the head. However, the invention is not limited thereto. For example, the determination of whether the users 2A and 2B are at the input state is based on the posture presented by the whole figure or partial limbs and trunk of each of the users 2A and 2B.

Figure 3:
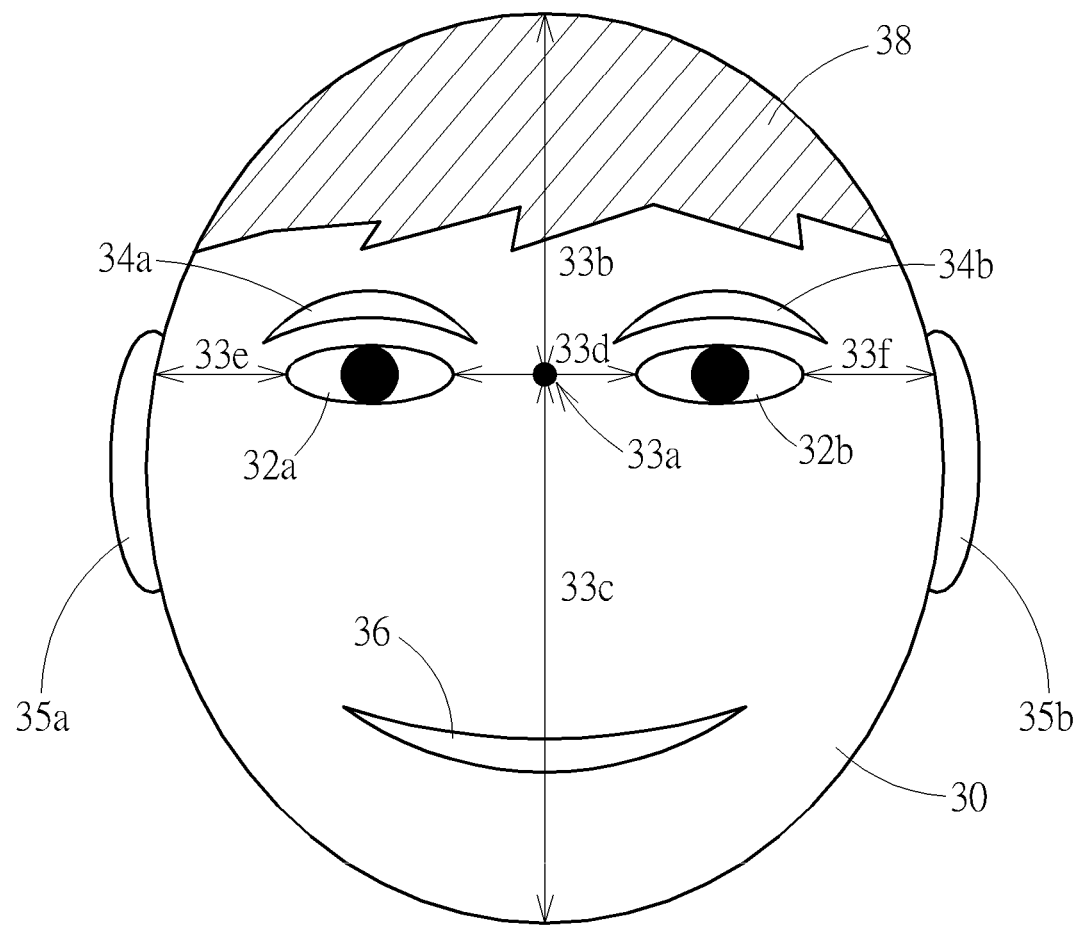
FIG. 3 is a schematic diagram illustrating a figure of a head.
Figure 4:
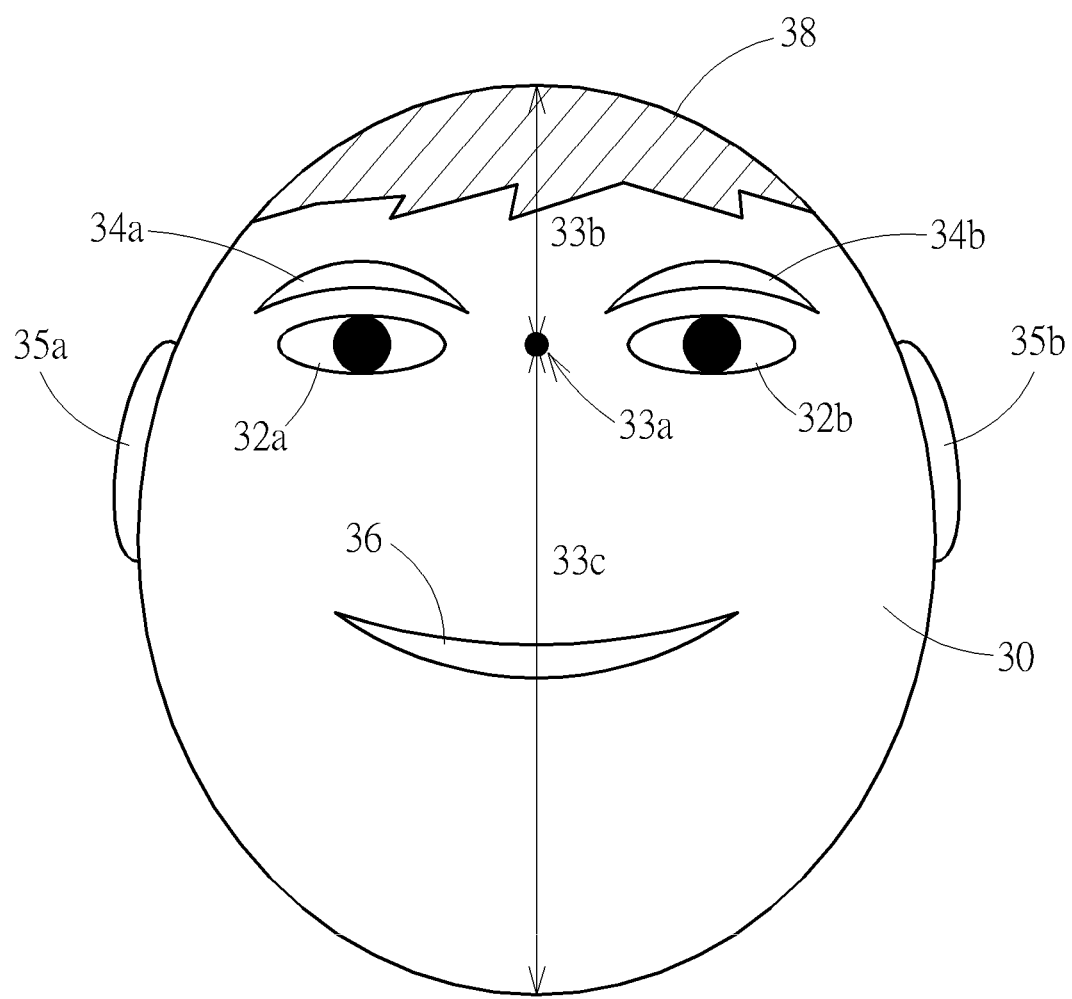
FIG. 4 is a schematic diagram illustrating a figure of the head up.
Figure 5:
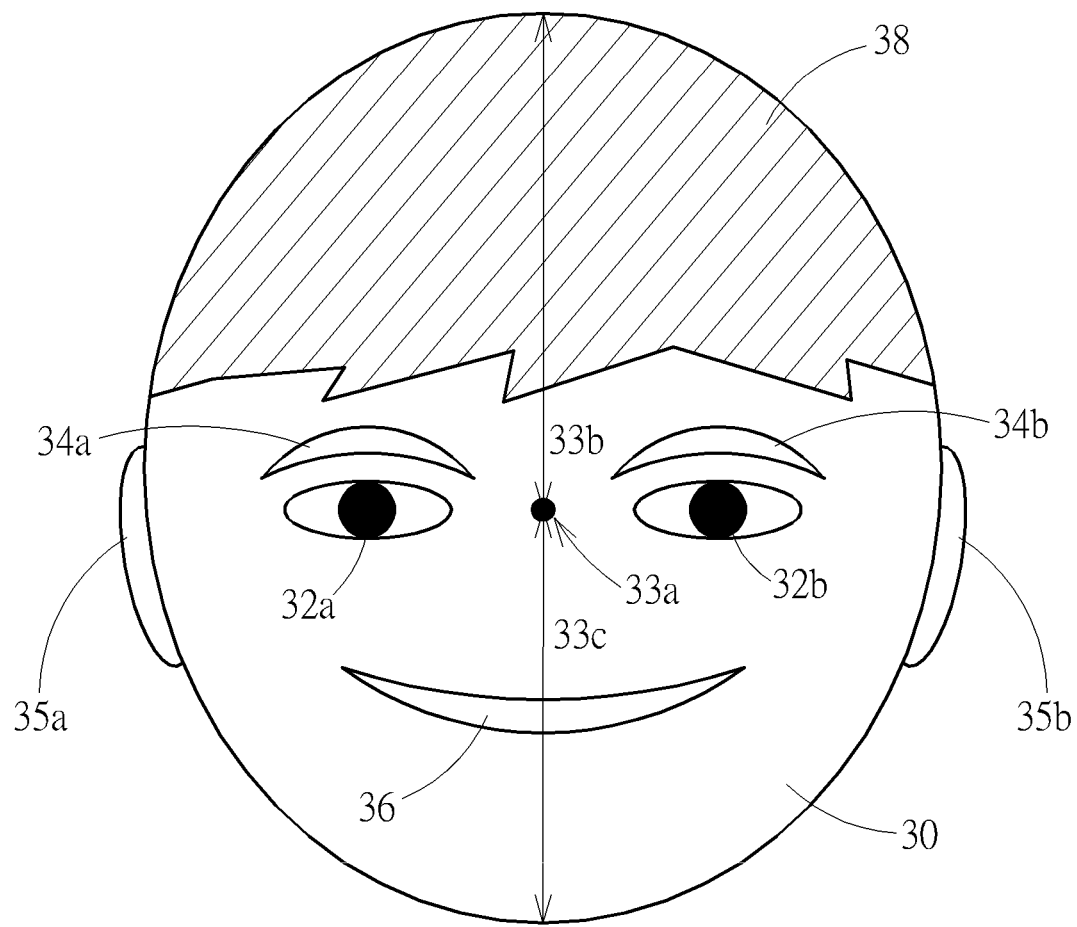
FIG. 5 is a schematic diagram illustrating a figure of the head down.
Figure 6:
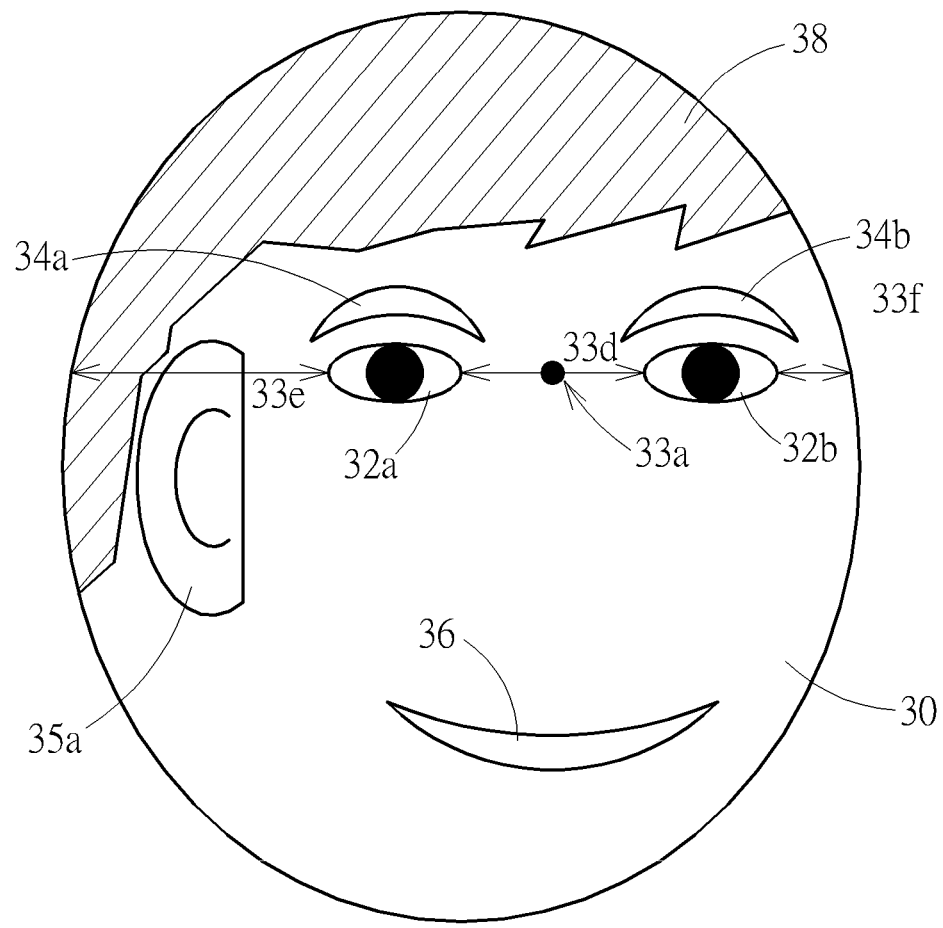
FIG. 6 is a schematic diagram illustrating a figure of the head facing to the left.

Please also refer to FIG. 3 which is a schematic diagram illustrating a figure of a head. For simplification of description and drawing, FIG. 3 only shows that the figure includes a head 30, a pair of eyes 32a and 32b, a pair of eyebrows 34a and 34b, a pair of ears 35a and 35b, a mouth 36 and hairs 38 (indicated by an area filled with hashed lines in the figure); other head features are not shown in the figure. In practice, for example, geometric dimensions of eyes 32a and 32b relative to the head 30 can be used for the determination of whether the user 2A or 2B corresponding to the figure is at the input state. Therein, a distance from a midpoint 33a of the eyes 32a and 32b (indicated by a spot in the figure) to an upper boundary of the head 30 (i.e. an upper edge of the figure of the head 30) is defined as an upper longitudinal length 33b. A distance from the midpoint 33a to a lower boundary of the head 30 (i.e. a lower edge of the figure of the head 30) is defined as a lower longitudinal length 33c. In practice, the midpoint 33a can be a midpoint of the minimum length between the profiles of the eyes 32a and 32b, or a midpoint of the maximum length between the profiles of the eyes 32a and 32b, or an average of the both. A ratio of the upper longitudinal length 33b to the lower longitudinal length 33c will change as the users 2A and 2B raise or bow their heads. Therefore, the ratio can be used to determine whether the users 2A and 2B face the screen 12a in the up-and-down direction. For example, when a value of the lower longitudinal length 33c divided by the upper longitudinal length 33b is greater than a first threshold value (i.e. the user 2A or 2B is regarded as facing upward, e.g. shown as FIG. 4) or less than a second threshold value (i.e. the user 2A or 2B is regarded as facing downward, e.g. shown as FIG. 5), the processor 18 determines that the user 2A or 2B corresponding to the figure is not at the input state. In practice, the first threshold value and the second threshold value can be set in advance (e.g. before leaving the factory) or by user (e.g. by directly inputting values, or by measuring the raising and bowing of the head of the user actually). For example, the first threshold value is 1.2, and the second threshold value is 0.8.

Furthermore, as shown by FIG. 3, a distance between the corresponding inner sides (i.e. inner corner) of the left eye 32a and the right eye 32b is defined as a middle transverse length 33d. A distance from an outer side (i.e. outer corner) of the left eye 32a to a left boundary of the head 30 (i.e. a left edge of the figure of the head 30) is defined as a left transverse length 33e. A distance from an outer side (i.e. outer corner) of the right eye 32b to a right boundary of the head 30 (i.e. a right edge of the figure of the head 30) is defined as a first right transverse length 33f. A Ratio of the left transverse length 33e to the middle transverse length 33d and a ratio of the right transverse length 33f to the middle transverse length 33d will change as the users 2A and 2B left and right swing their heads (or transversely move their heads). Therefore, the ratios can be used to determine whether the users 2A and 2B face the screen 12a in the left-and-right direction. For example, when a value of the maximum one of the left transverse length 33e and the right transverse length 33f divided by the middle transverse length 33d is greater than a third threshold value (i.e. the user 2A or 2B is regarded as facing left or right, e.g. shown as FIG.

Figure 7:
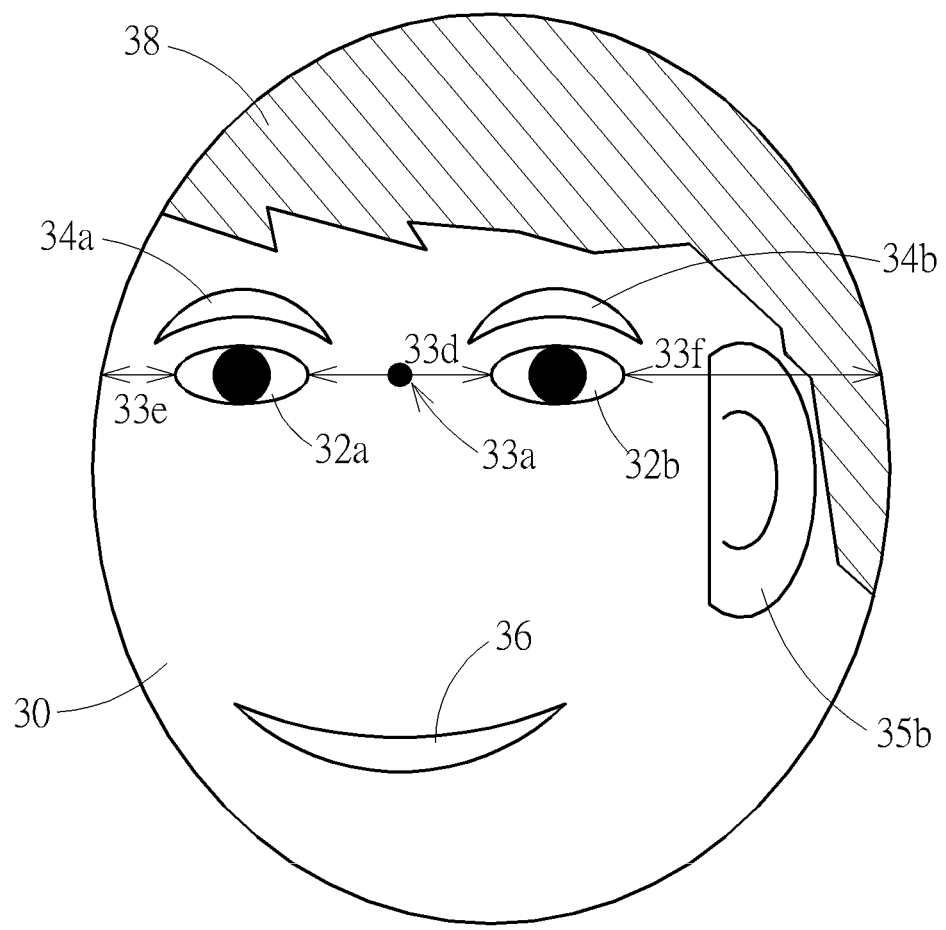
FIG. 7 is a schematic diagram illustrating a figure of the head facing to the right.

6 and FIG. 7), the processor 18 determines that the user 2A or 2B corresponding to the figure is not at the input state. Furthermore, for example, for a case that the head 30 only swings left or right, when the value of the maximum one of the left transverse length 33e and the right transverse length 33f divided by the middle transverse length 33d is less than a fourth threshold value (i.e. the user 2A or 2B is regarded as facing the screen 12a), the processor 18 determines that the user 2A or 2B corresponding to the figure is at the input state. In practice, the third threshold value and the fourth threshold value can be set in advance (e.g. before leaving the factory) or by user (e.g. by directly inputting values, or by measuring the left and right moving of the head of the user actually). For example, the third threshold value is 1.5, and the fourth threshold value is 1.3.

Furthermore, in the above description, the determination of whether the users 2A and 2B are at the input state is based on either an up-and-down movement or a left-and-right movement of the head of the users 2A and 2B. However, an actual movement of the head of the users 2A and 2B may include both an up-and-down component and a left-and-right component (e.g. the head obliquely moves), so in an actual case, the processor 18 can make the determination according to both the degree of an up-and-down displacement and the degree of a left-and-right displacement. For example, the processor 18 can determine whether the users 2A and 2B raise or bow their heads excessively and swing their heads left or right excessively according to the degree of an up-and-down displacement and the degree of a left-and-right displacement respectively. If an excessive up-and-down displacement (e.g. the corresponding ratio in the foregoing is greater than the first threshold value or less than the second threshold value) or an excessive left-and-right displacement (e.g. the corresponding ratio in the foregoing is greater than the third threshold value) occurs, the processor 18 determines that the users 2A and 2B are not at the input state. For another example, when the processor 18 determines that the users 2A and 2B move their heads in both the up-and-down direction and the left-and-right direction at the same time, the processor 18 will weight the degrees of the up-and-down component and the left-and-right component (i.e. expressed in ratio as described in the foregoing) respectively, add them together, and determine whether the users 2A and 2B are at the input state according to the sum. For example, when the sum is beyond a range (e.g. defined by two threshold values), the processor 18 determines that the users 2A and 2B are not at the input state. For another example, an acceptance range for the users 2A and 2B to move their heads in the up-and-down direction and the left-and-right direction is used as the criterion for the determination of whether the users 2A and 2B are at the input state. Therein, in logic, the acceptance range can be expressed on a two-dimension plane; for example, the horizontal axis thereof represents the degree of the left-and-right displacement, and the vertical axis thereof represents the degree of the up-and-down displacement. The degrees of the left-and-right displacement and the up-and-down displacement can be expressed by the corresponding ratios in the foregoing. The acceptance range can include at least one region on the two-dimension plane. In practice, the acceptance range can be set in advance (e.g. according to an application scenario for the non-contact human input system 1) or by user. The acceptance range can be expressed by a plurality of inequalities, which is conducive to the determination rate of the processor 18.

Figure 8:
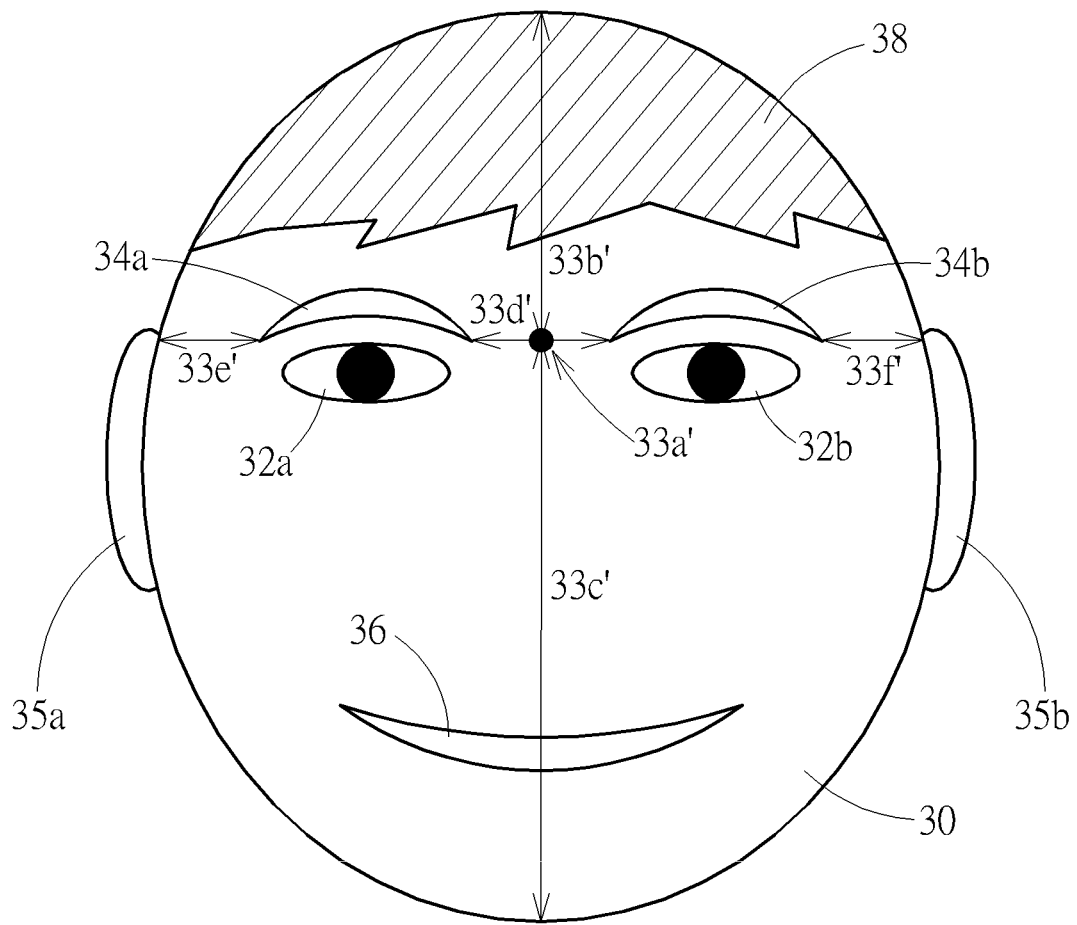
FIG. 8 is a schematic diagram illustrating a figure of the head.

In addition, the above determination on the up-and-down displacement and the left-and-right displacement of the heads of the users 2A and 2B is based on the geometric dimensions of the eyes 32a and 32b relative to the head 30; however, in practice, the above determination also can be based on the eyebrows 34a and 34b. For example, as shown by FIG. 8 (which uses similar reference numbers for convenience of referring to the above description), a distance from a midpoint 33a' (indicated by a spot in the figure) of the eyebrows 34a and 34b to the upper boundary of the head 30 is defined as an upper longitudinal length 33b'. A distance from the midpoint 33a' to the lower boundary of the head 30 is defined as a lower longitudinal length 33c'. A distance between the corresponding inner sides of the left eyebrow 34a and the right eyebrow 34b (i.e. the heads of the eyebrows) is defined as a middle transverse length 33d'. A distance from an outer side of the left eyebrow 34a (i.e. the tail of the left eyebrow 34a) to the left boundary of the head 30 is defined as a left transverse length 33e'. A distance from an outer side of the right eyebrow 34b to the right boundary of the head 30 is defined as a right transverse length 33f'. When a value of the lower longitudinal length 33c' divided by the upper longitudinal length 33b' is greater than a fifth threshold value or less than a sixth threshold value, the processor 18 determines that the user 2A or 2B corresponding to the figure is not at the input state. When a value of the maximum one of the left transverse length 33e' and the right transverse length 33f' divided by the middle transverse length 33d' is greater than a seventh threshold value (i.e. the user 2A or 2B is regarded as facing left or right), the processor 18 determines that the user 2A or 2B corresponding to the figure is not at the input state. For a case that the head 30 only swings left or right, when the value of the maximum one of the left transverse length 33e' and the right transverse length 33f' divided by the middle transverse length 33d' is less than an eighth threshold value (i.e. the user 2A or 2B is regarded as facing the screen 12a), the processor 18 determines that the user 2A or 2B corresponding to the figure is at the input state. Furthermore, the fifth to eighth threshold values also can be set in advance or by user through an actual experiment. The above descriptions for the case that the determination is made according to both the degree of an up-and-down displacement and the degree of a left-and-right displacement of the heads of the users 2A and 2B are also applicable herein and will not be repeatedly described.

In addition, in the foregoing, the geometric dimensions of eyes 32a and 32b and eyebrows 34a and 34b relative to the head 30 can be used for the determination of whether the user 2A or 2B is at the input state; in practice, it is also applicable that geometric dimensions of ears 35a and 35b relative to the head 30 can be used for the determination of whether the user 2A or 2B is at the input state. Furthermore, in practice, when the head swings left or right excessively, the figure may include either the single eye 32a or the single eye 32b (and either the single eyebrow 34a or the single eyebrow 34b, either the single ear 35a or the single ear 35b correspondingly). In this case, the processor 18 determines that the user 2A or 2B corresponding to the figure is not at the input state.

Furthermore, in the embodiment, the first camera 14a and the second camera 14b are disposed at the middle of the upper rim of the displaying device 12 for simplification of description. In practice, if the locations of the first camera 14a and the second camera 14b diverge from the middle of the upper rim, the above descriptions about the tendency to the ratio variation of the geometric dimensions (i.e. lengths 33b-33f) also can be applicable herein. In this case, threshold values that are used for determination of whether the users 2A and 2B face the screen 12a to be at the input state are also can be determined referring to the foregoing, and will not be described in addition.

In the embodiment, when the processor 18 determines that the user 2A or 2B corresponding to the figure is not at the input state, the non-contact human input interface (or the processor 18) ignores actions of the user 2A or 2B (i.e. not taking the current actions of the user 2A or 2B as input operations for the determination whether the inputs are legal (or not responding to the current actions of the user 2A or 2B), the actions may include sounds, body movements and so on). When the processor 18 determines that the user 2A or 2B corresponding to the figure is at the input state, the processor 18 will receive a voice input (e.g. through the microphone 16) or a posture input (e.g. through the second camera 14b) from the user 2A or 2B through the non-contact human input interface, and further respond to the voice input or the posture input, e.g. by controlling the displaying device 12 to change a cursor location of an image displayed on the screen 12a, close a window, open a file, and so on. In the contrary, when processor 18 determines that the user 2A or 2B corresponding to the figure is not at the input state, the body movements and sounds of the user 2A or 2B will not be regarded as legal inputs by the processor 18. Therefore, the non-contact human input system 1 in the above embodiments can determine whether the users 2A and 2B are at the input state, so as to avoid regarding responses of the users 2A and 2B which are not intended to be non-contact inputs as legal inputs resulting in unexpected system responses, such as closing a window, deleting files. Furthermore, in practice, the voice input can be a user voice or other man-made sound, e.g. snapping fingers. Furthermore, in practice, the posture input can be a posture provided by the user as a whole or a posture provided by a portion of body of the user, e.g. a gesture. For the posture input, when the processor 18 determines that the user 2A or user 2B is at the input state, the processor 18 uses the second camera 14b to capture a gesture image of the corresponding user 2A or user 2B as the posture input. However, the invention is not limited thereto. For example, the processor 18 can use the first camera 14a again to capture the gesture image. In this case, the second camera 14b can be omitted from the non-contact human input system 1; that is, only the first camera 14a is disposed. For another example, the processor 18 also can extract a sub image with respect to a hand of the user 2A or 2B as the above gesture image from the image that is used for the above determination of whether the user 2A or 2B is at the input state. In this case, the second camera 14b can be omitted from the non-contact human input system 1; that is, only the first camera 14a is disposed. In addition, in the embodiment, the first camera 14a and the second camera 14b are used for different purposes, of which the specifications are not limited to the same in practice.

In addition, in practice, the operations of the processor 18 in the foregoing can be implemented by software, also capable of being in coordination with specific hardware (e.g. the processor 18 including a specific image-processing unit available on the market, e.g. especially for identifying facial features, for processing image signals received from the cameras 14a and 14b).

Figure 9:
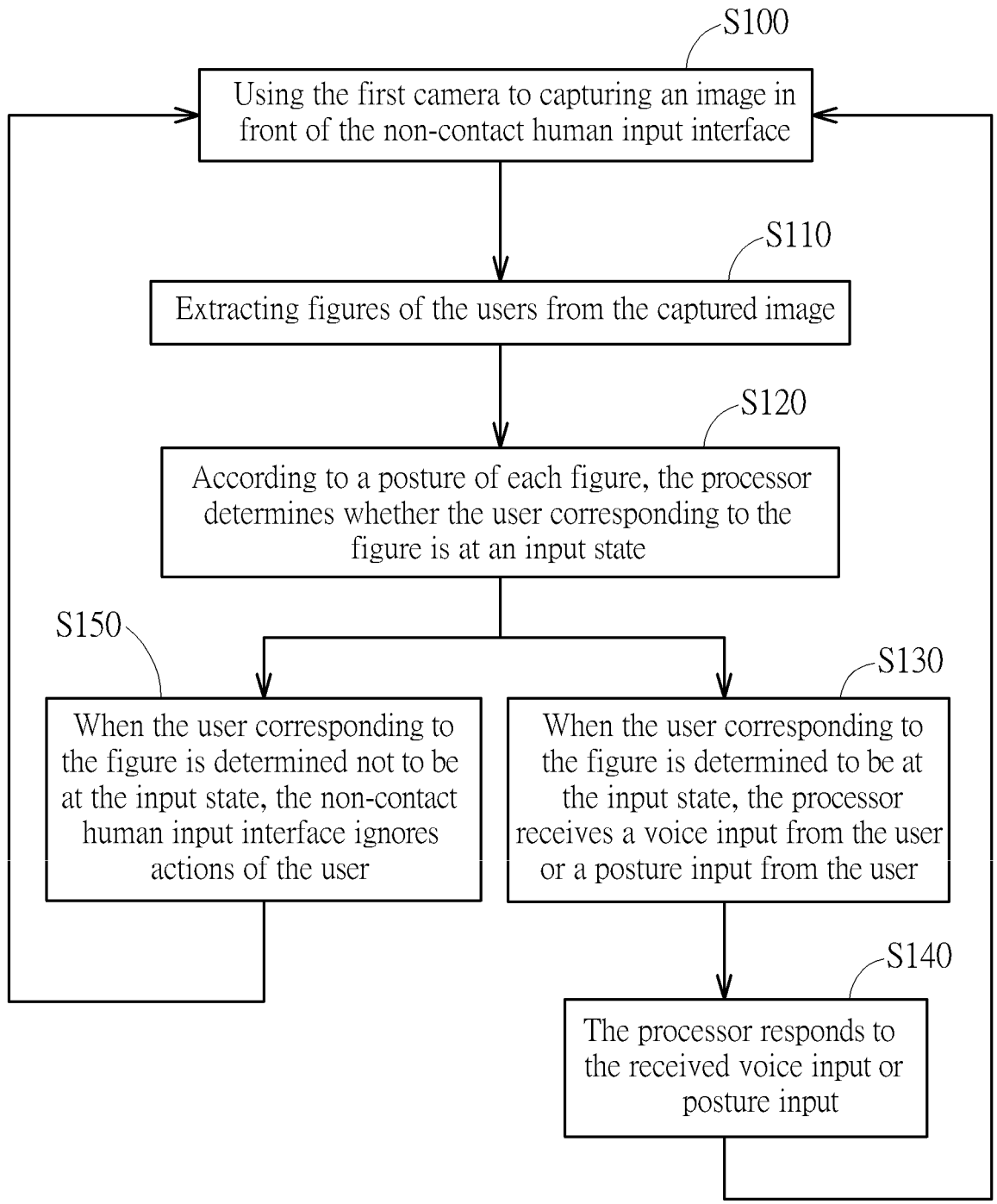
FIG. 9 is a flow chart of a non-contact human input method according to an embodiment.

Please refer to FIG. 9, which is a flow chart of a non-contact human input method according to an embodiment. For simplification of description, the non-contact human input method is based on the above non-contact human input system 1. For the details of the components of the non-contact human input system 1, please refer to the relevant descriptions (including those for variations of the components) and drawings in the foregoing, which will not be described in addition. In the embodiment, as shown by the step S100, the method is to use the first camera 14a to capturing an image in front of the non-contact human input interface (e.g. an image in front of the displaying device 12). As shown by the step S110, the processor 18 extracts figures of the users 2A and 2B from the captured image. As shown by the step S120, according to a posture of each figure, the processor 18 determines whether the user 2A or 2B corresponding to the figure is at an input state. As shown by the step S130, when the user 2A or 2B corresponding to the figure is determined to be at the input state, the processor 18 receives a voice input from the user 2A or 2B (e.g. receiving voice of the user or sound made by the user through the microphone 16) or a posture input from the user 2A or 2B (e.g. capturing a gesture image of the user through the second camera 14b). As shown by the step S140, the processor 18 responds to the received voice input or posture input (i.e. the input operation by the user 2A or 2B), e.g. by controlling the displaying device 12 to change a cursor location of an image displayed on the screen 12a, close a window, open a file, and so on. As shown by the step S150, when the user 2A or 2B corresponding to the figure is determined not to be at the input state, the non-contact human input interface (or the processor 18) ignores actions of the user 2A or 2B (i.e. not taking the current actions of the user 2A or 2B as input operations for the determination whether the inputs are legal, the actions may include sounds, body movements and so on). After the steps S140 and S150, the flow chart of the method flows back to the step S100 for next capturing images of the users 2A and 2B and determining the statuses of the users 2A and 2B. Furthermore, in practice, the step S100 can be but not limited to implemented periodicity or triggered by other events (e.g. a change in an image received by the processor 18 through the first camera 14a).

In general, when the users 2A and 2B are at the input state, the users 2A and 2B will gaze at or face toward the screen 12a of the displaying device 12. Therefore, in practice, whether the user 2A or 2B gazes at or faces toward the screen 12a can be identified by determining the status of the head of the user 2A or 2B. In the embodiment, the figure at least includes a head and at least one organ on the head. The processor 18 can determine whether the users 2A and 2B are at the input state according to the head and the geometric dimensions of the at least one organ relative to the head. However, the invention is not limited thereto. For example, the determination of whether the users 2A and 2B are at the input state is based on the posture presented by the whole figure or partial limbs and trunk of each of the users 2A and 2B.

Figure 10:
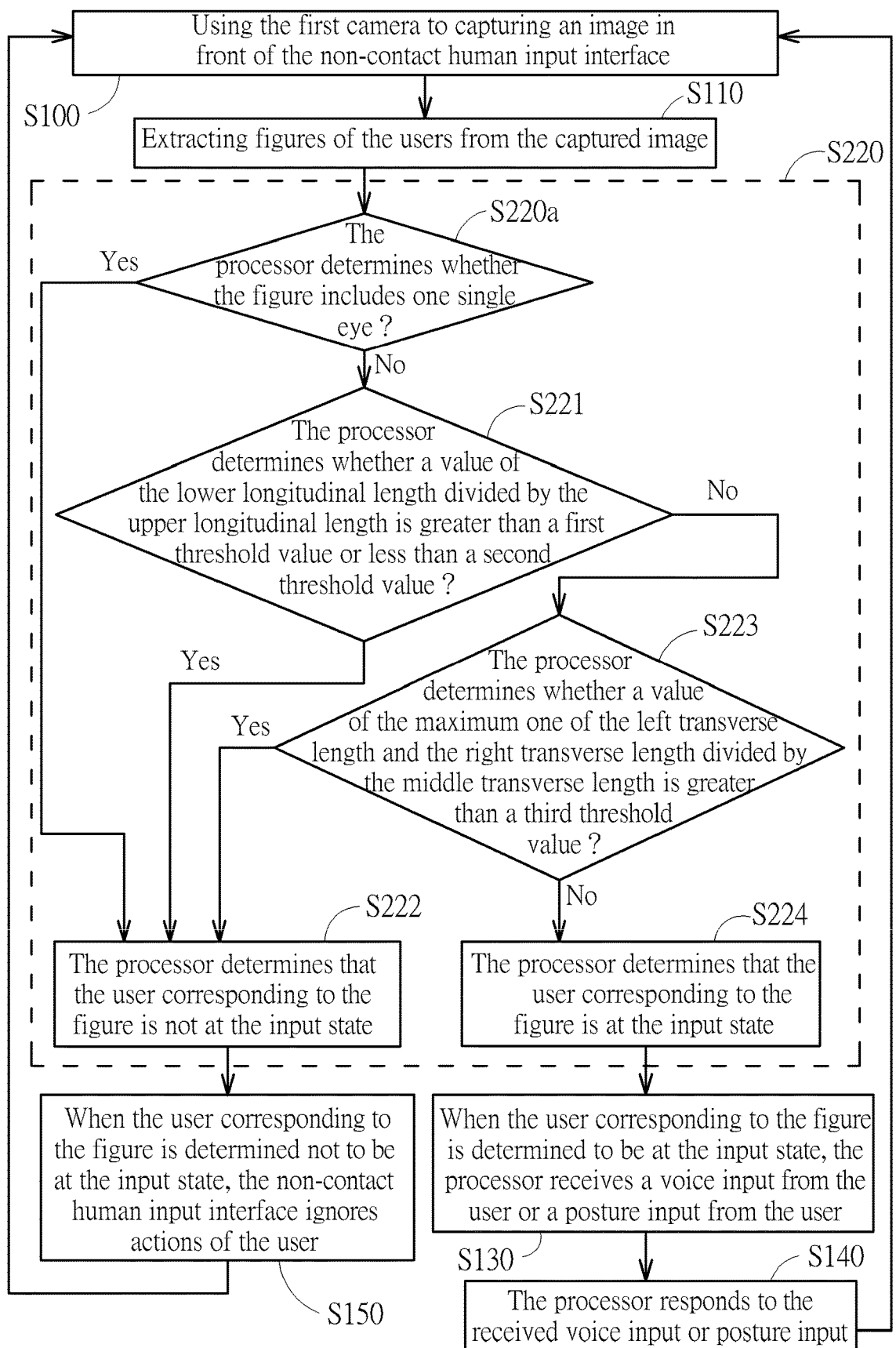
FIG. 10 is a flow chart of a non-contact human input method according to another embodiment.

In the embodiment, as shown by FIG. 10 (please also referring to FIG. 3), the above step S120 is implemented by the step S220. As shown by the step S221, the method is to use the processor 18 to determine whether a value of the lower longitudinal length 33c divided by the upper longitudinal length 33b is greater than a first threshold value or less than a second threshold value. Therein, the first threshold value can be 1.2, and the second threshold value can be 0.8. If the determination result is YES, the processor 18 determines that the user 2A or 2B corresponding to the figure is not at the input state, as shown by the step S222. If the determination result is NO, the processor 18 determines whether a value of the maximum one of the left transverse length 33e and the right transverse length 33f divided by the middle transverse length 33d is greater than a third threshold value, as shown by the step S223. Therein, the third threshold value can be 1.5. If the determination result is YES, the processor 18 determines that the user 2A or 2B corresponding to the figure is not at the input state, as shown by the step S222. If the determination result is NO, the face of the user 2A or 2B corresponding to the figure is regarded as being toward the screen 12a in both vertical direction (i.e. the direction of raising or bowing) and horizontal direction (i.e. the direction of swing left and right). Therefore, the processor 18 determines that the user 2A or 2B corresponding to the figure is at the input state, as shown by the step S224. Then, the method proceeds with the step S130. Furthermore, when the user 2A or 2B is determined not to be at the input state (i.e. the step S222), the method proceeds with the step S150. Afterwards, the method flows back to the step S100 for next capturing images of the users 2A and 2B and determining the statuses of the users 2A and 2B. In addition, in the embodiment, the method proceeds with the step S221 and then the step S223; however, the invention is not limited thereto. For example, the method proceeds with the step S223 and then the step S221, which also can achieve the effect of the step S220.

Figure 11:
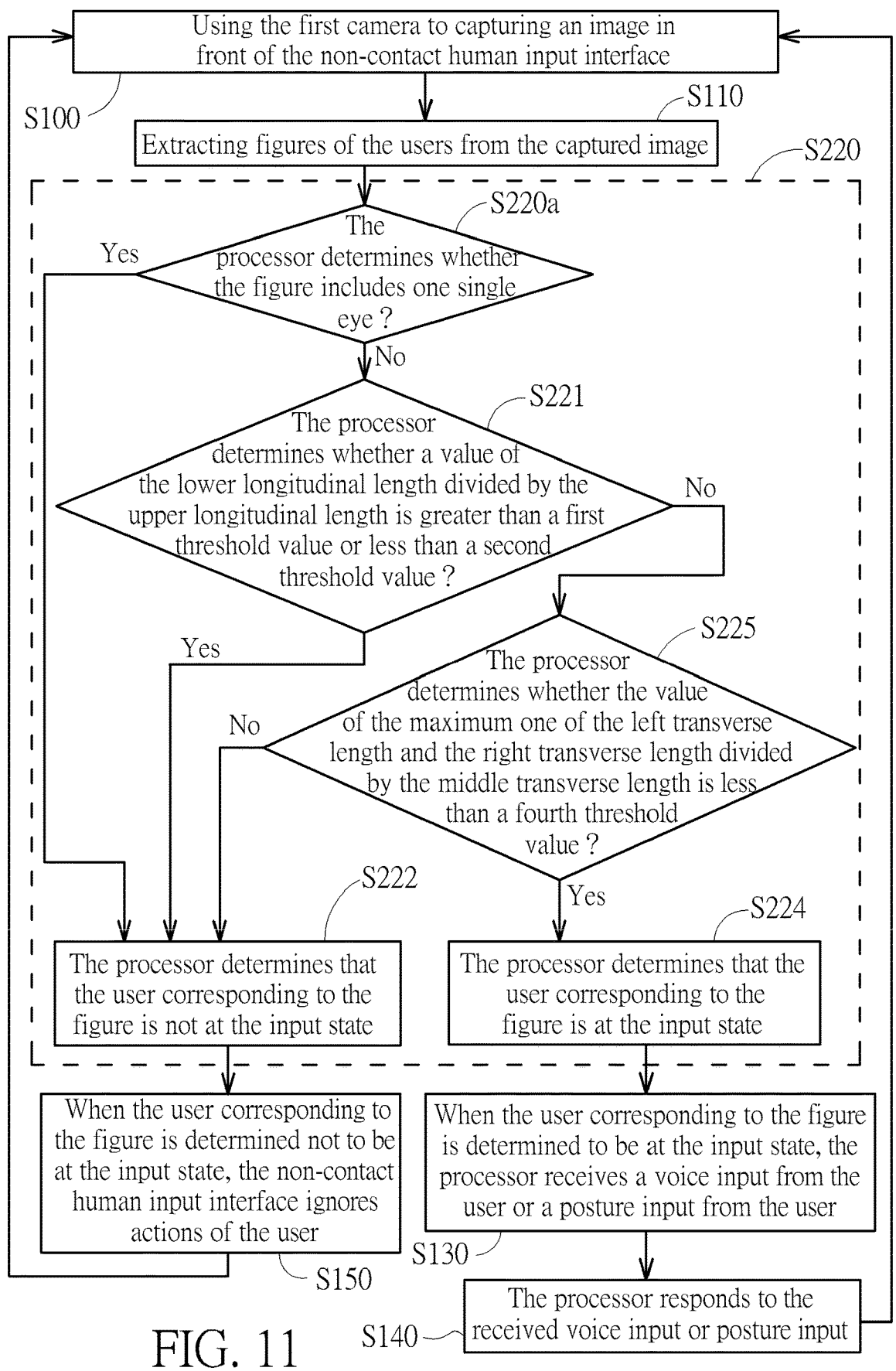
FIG. 11 is a flow chart of a non-contact human input method according to another embodiment.

In addition, in practice, the step S223 can be modified to make the processor 18 determine whether the value of the maximum one of the left transverse length 33e and the right transverse length 33f divided by the middle transverse length 33d is less than a fourth threshold value, as shown by the step S225 in FIG. 11. Therein, the fourth threshold value can be 1.3. As shown by FIG. 11, if the determination result is NO, the processor 18 determines that the user 2A or 2B corresponding to the figure is not at the input state, as shown by the step S222. If the determination result is YES, the face of the user 2A or 2B corresponding to the figure is regarded as being toward the screen 12a in both vertical direction (i.e. the direction of raising or bowing) and horizontal direction (i.e. the direction of swing left and right). Therefore, the processor 18 determines that the user 2A or 2B corresponding to the figure is at the input state, as shown by the step S224.

In addition, in the method for the above embodiments, the implement of the step S220 is based on the geometric dimensions of the eyes 32a and 32b relative to the head 30; however, in practice, the above determination also can be based on the eyebrows 34a and 34b. In other words, in the step S220, the midpoint 33a is replaced by the midpoint of eyebrows 34a and 34b that is defined as the midpoint 33a'. The upper longitudinal length 33b is replaced by the distance from the midpoint 33a' of the eyebrows 34a and 34b to the upper boundary of the head 30 that is defined as the upper longitudinal length 33b'. The lower longitudinal length 33c is replaced by the distance from the midpoint 33a' of the eyebrows 34a and 34b to the lower boundary of the head 30 that is defined as the lower longitudinal length 33c'. The middle transverse length 33d is replaced by the distance between the corresponding inner sides of the left eyebrow 34a and the right eyebrow 34b that is defined as the middle transverse length 33d'. The left transverse length 33e is replaced by the distance from the outer side of the left eyebrow 34a to the left boundary of the head 30 that is defined as the left transverse length 33e'. The right transverse length 33f is replaced by the distance from the outer side of the right eyebrow 34b to the right boundary of the head 30 is defined as the right transverse length 33f'. Furthermore, in the foregoing, the geometric dimensions of eyes 32a and 32b and eyebrows 34a and 34b relative to the head 30 can be used for the determination of whether the user 2A or 2B is at the input state; in practice, it is also applicable that geometric dimensions of ears 35a and 35b relative to the head 30 can be used for the determination of whether the user 2A or 2B is at the input state. Furthermore, in the foregoing, the above descriptions for the case that the determination is made according to both the degree of an up-and-down displacement and the degree of a left-and-right displacement of the heads of the users 2A and 2B are also applicable herein and will not be repeatedly described.

Furthermore, in practice, when the head swings left or right excessively, the figure may include either the single eye 32a or the single eye 32b (and either the single eyebrow 34a or the single eyebrow 34b, either the single ear 35a or the single ear 35b correspondingly). Therefore, based on the embodiment as shown by FIG. 10, the step S220 further includes the step S220a, in which the processor 18 determines whether the figure includes either the single eye 32a or the single eye 32b (and either the single eyebrow 34a or the single eyebrow 34b correspondingly). If the determination result is YES, the processor 18 determines that the user 2A or 2B corresponding to the figure is not at the input state, as shown by the step S222. If the determination result is NO, the method proceeds with the step S221.

Therefore, in the above embodiments, the non-contact human input method can determine whether the users 2A and 2B are at the input state, so as to avoid regarding responses of the users 2A and 2B which are not intended to be non-contact inputs as legal inputs resulting in unexpected system responses, such as closing a window, deleting files.

Figure 12:
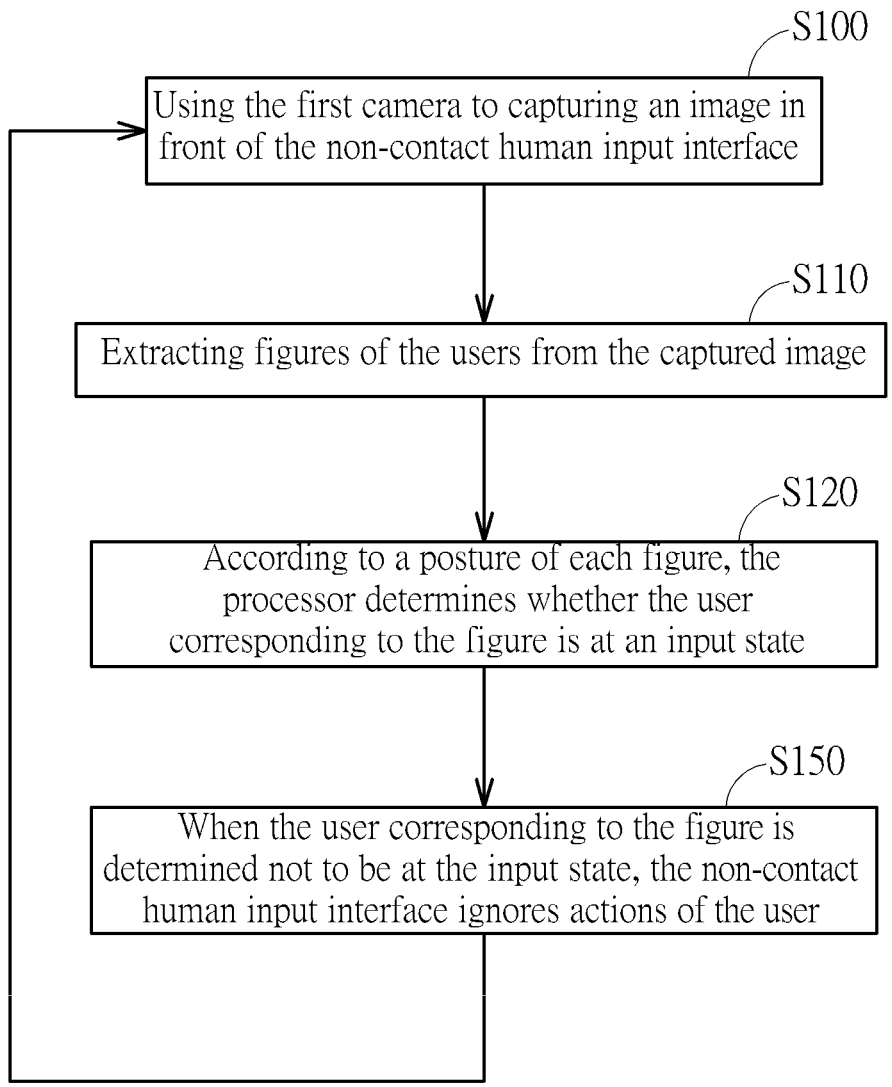
FIG. 12 is a flowchart of a method of identifying a non-contact human input according to an embodiment.

As described above, in the above embodiments, both the non-contact human input system 1 and the non-contact human input method can determine whether the users 2A and 2B are at the input state. Please refer to FIG. 12. The non-contact human input method according to an embodiment includes steps like the steps S100, S110, S120 and S150 in FIG. 9 (for the relevant descriptions thereof, please referring to the foregoing, which will not be repeated in addition). In other words, the non-contact human input method shown by FIG. 9 includes the non-contact human input method shown by FIG. 12 and receives the input operation by the user 2A or 2B when the corresponding user 2A or 2B (as shown by the step S130) and responds to the input operation (as shown by the step S140). Besides, the cases of the flow charts shown by FIG. 10 and FIG. 11 with removing the steps S130 and S140 can be taken as embodiments for the non-contact human input method shown by FIG. 12. These embodiments will not be described in addition. For relevant descriptions about these embodiments, please refer to the foregoing.

Similarly, the non-contact human input method according to the embodiment can determine whether the users 2A and 2B are at the input state, so as to avoid regarding responses of the users 2A and 2B which are not intended to be non-contact inputs as legal inputs resulting in unexpected system responses, such as closing a window, deleting files.

As stated above, the invention provides a non-contact human input method and a non-contact human input system, which determine whether a user is at an input state by analyzing a posture of the user, so as to avoid regarding responses of a user (including actions, sounds and so on) which are not intended to be non-contact inputs as inputs. Therefore, the invention can effectively solve the problem that the input system in the prior art produces an unexpected system response because of receiving a gesture of a user which is not for input.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A non-contact human input method for a non-contact human input system, the non-contact human input method comprising the following steps of:
   (a) capturing an image in front of a non-contact human input interface of the non-contact human input system;
   (b) extracting a figure from the image, the figure comprising a head and left and right eyes on the head, a distance between the left eye and the right eye being defined as a first middle transverse length, a distance from an outer side of the left eye to a left boundary of the head being defined as a first left transverse length, a distance from an outer side of the right eye to a right boundary of the head being defined as a first right transverse length;
   (c) determining whether a user corresponding to the figure is at an input state according to a posture of the figure, in which when a value of a maximum one of the first left transverse length and the first right transverse length divided by the first middle transverse length is greater than a third threshold value, the user corresponding to the figure is determined not to be at the input state; and
   (d) the non-contact human input interface ignoring actions of the user corresponding to the figure when the user corresponding to the figure is determined not to be at the input state.

2. The non-contact human input method according to claim 1, wherein a distance from a midpoint of the left and right eyes to an upper boundary of the head is defined as a first upper longitudinal length, a distance from the midpoint to a lower boundary of the head is defined as a first lower longitudinal length, and in the step (c), when a value of the first lower longitudinal length divided by the first upper longitudinal length is greater than a first threshold value or less than a second threshold value, the user corresponding to the figure is determined not to be at the input state.

3. The non-contact human input method according to claim 2, wherein the first threshold value is 1.2, and the second threshold value is 0.8.

4. The non-contact human input method according to claim 1, wherein the figure comprises a pair of eyebrows on the head, a distance from a midpoint of the pair of eyebrows to an upper boundary of the head is defined as a second upper longitudinal length, a distance from the midpoint to a lower boundary of the head is defined as a second lower longitudinal length, and in the step (c), when a value of the second lower longitudinal length divided by the second upper longitudinal length is greater than a fifth threshold value or less than a sixth threshold value, the user corresponding to the figure is determined not to be at the input state.

5. The non-contact human input method according to claim 1, wherein the third threshold value is 1.5.

6. A non-contact human input method for a non-contact human input system, the non-contact human input method comprising the following steps of:
   (a) capturing an image in front of a non-contact human input interface of the non-contact human input system;
   (b) extracting a figure from the image, the figure comprising a head and left and right eyebrows on the head, a distance from a midpoint of the left and right eyebrows to an upper boundary of the head being defined as a second upper longitudinal length, a distance from the midpoint to a lower boundary of the head being defined as a second lower longitudinal length, a distance between the left and right eyebrows being defined as a second middle transverse length, a distance from an outer side of the left eyebrow to a left boundary of the head being defined as a second left transverse length, a distance from an outer side of the right eyebrow to a right boundary of the head being defined as a second right transverse length;
   (c) determining whether a user corresponding to the figure is at an input state according to a posture of the figure, in which the user corresponding to the figure is determined not to be at the input state, when a value of the second lower longitudinal length divided by the second upper longitudinal length is greater than a fifth threshold value or less than a sixth threshold value, or when a value of the second lower longitudinal length divided by the second upper longitudinal length is greater than a fifth threshold value or less than a sixth threshold value; and
   (d) the non-contact human input interface ignoring actions of the user corresponding to the figure when the user corresponding to the figure is determined not to be at the input state.

7. The non-contact human input method according to claim 1, further comprising the following step of:
   (e) the non-contact human input system receiving a voice input or a posture input from the user through the non-contact human input interface when the user corresponding to the figure is determined to be at the input state.

8. The non-contact human input method according to claim 7, wherein in the step (a), a camera is used to capture the image in front of the non-contact human input interface, and in the step (e), another camera is used to capture a gesture image of the user as the posture input.

9. A non-contact human input system, comprising:
   a displaying device;
   at least one camera; and
   a processor, electrically connected to the displaying device and the at least one camera, the processor using the at least one camera to capture an image in front of the displaying device, extracting a figure from the image, and determining whether a user corresponding to the figure is at an input state according to a posture of the figure, the processor ignoring actions of the user corresponding to the figure when the processor determines that the user corresponding to the figure is not at the input state, the processor receiving a voice input or a posture input from the user when the processor determines that the user corresponding to the figure is at the input state;
   wherein the figure comprising a head and left and right eyes on the head, a distance from a midpoint of the left and right eyes to an upper boundary of the head is defined as a first upper longitudinal length, a distance from the midpoint to a lower boundary of the head is defined as a first lower longitudinal length, a distance between the left and right eyes is defined as a first middle transverse length, a distance from an outer side of the left eye to a left boundary of the head is defined as a first left transverse length, a distance from an outer side of the right eye to a right boundary of the head is defined as a first right transverse length, and
   the processor determines that the user corresponding to the figure is not at the input state, when a value of the first lower longitudinal length divided by the first upper longitudinal length is greater than a first threshold value or less than a second threshold value, or when a value of a maximum one of the first left transverse length and the first right transverse length divided by the first middle transverse length is greater than a third threshold value.

10. The non-contact human input system according to claim 9, wherein the first threshold value is 1.2, and the second threshold value is 0.8.

11. The non-contact human input system according to claim 9, wherein the figure comprises a pair of eyebrows on the head, a distance from a midpoint of the pair of eyebrows to an upper boundary of the head is defined as a second upper longitudinal length, a distance from the midpoint to a lower boundary of the head is defined as a second lower longitudinal length, and when a value of the second lower longitudinal length divided by the second upper longitudinal length is greater than a fifth threshold value or less than a sixth threshold value, the processor determines that the user corresponding to the figure is not at the input state.

12. The non-contact human input system according to claim 9, wherein the third threshold value is 1.5.

13. The non-contact human input system according to claim 9, wherein the figure comprises left and right eyebrows on the head, a distance between the left eyebrow and the right eyebrow is defined as a second middle transverse length, a distance from an outer side of the left eyebrow to a left boundary of the head is defined as a second left transverse length, a distance from an outer side of the right eyebrow to a right boundary of the head is defined as a second right transverse length, and when a value of a maximum one of the second left transverse length and the second right transverse length divided by the middle transverse length is greater than a seventh threshold value, the processor determines that the user corresponding to the figure is not at the input state.

14. The non-contact human input system according to claim 9, wherein the at least one camera comprises a first camera and a second camera, the processor uses the first camera to capture the image in front of the displaying device, and the processor uses the second camera to capture a gesture image of the user as the posture input.

15. A non-contact human input method for a non-contact human input system, the non-contact human input method comprising the following steps of:
   (a) capturing an image in front of a non-contact human input interface of the non-contact human input system;
   (b) extracting a figure from the image, the figure comprising a head and a pair of eyes on the head, a distance from a midpoint of the pair of eyes to an upper boundary of the head being defined as a first upper longitudinal length, a distance from the midpoint to a lower boundary of the head being defined as a first lower longitudinal length;
   (c) determining whether a user corresponding to the figure is at an input state according to a posture of the figure, in which when a value of the first lower longitudinal length divided by the first upper longitudinal length is greater than a first threshold value or less than a second threshold value, the user corresponding to the figure is determined not to be at the input state; and
   (d) the non-contact human input interface ignoring actions of the user corresponding to the figure when the user corresponding to the figure is determined not to be at the input state.

* * * * *